United States Patent
Burris et al.

(10) Patent No.: US 10,769,908 B1
(45) Date of Patent: Sep. 8, 2020

(54) SECURE ZONE MONITOR

(71) Applicant: NCR Corporation, Atlanta, GA (US)

(72) Inventors: Matthew Robert Burris, Atlanta, GA (US); Sudip Rahman Khan, Decatur, GA (US); Jodessiah Sumpter, Roswell, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/383,089

(22) Filed: Apr. 12, 2019

(51) Int. Cl.
G08B 13/00 (2006.01)
G08B 13/196 (2006.01)
G06K 9/00 (2006.01)

(52) U.S. Cl.
CPC ... *G08B 13/19613* (2013.01); *G06K 9/00335* (2013.01); *G06K 9/00362* (2013.01); *G06K 9/00771* (2013.01)

(58) Field of Classification Search
CPC .............. G08B 13/19613; H04L 63/08; H04L 63/0492; H04N 5/225
See application file for complete search history.

(56) References Cited

U.S. PATENT DOCUMENTS

| 7,631,808 B2 * | 12/2009 | Kundu | G07F 17/3241 235/383 |
| 9,036,028 B2 * | 5/2015 | Buehler | G08B 13/19602 348/159 |
| 2005/0102183 A1 * | 5/2005 | Kelliher | G06Q 20/20 705/16 |
| 2009/0089107 A1 * | 4/2009 | Angell | G06Q 10/00 705/7.28 |

* cited by examiner

*Primary Examiner* — Toan N Pham
(74) *Attorney, Agent, or Firm* — Schwegman, Lundberg & Woessner

(57) ABSTRACT

Cameras capture time-stamped images within predefined areas (zones). Behaviors and actions of persons are tracked in the images with respect objects (assets) located within the zones based on rules. A risk assessment is dynamically adjusted based on the behaviors, actions, and the rules. An automated action is processed based on the risk assessment. A current risk score drives reporting, notifications, auditing, and security processes based on the rules. In an embodiment, a variety of sensors are located within the zones and provide real-time events with respect to some actions of a person or persons present within the zones.

15 Claims, 5 Drawing Sheets

SECURE ZONE MONITOR

BACKGROUND

Many enterprises have advanced security procedures and technology. The purposes of these security systems are to restrict access to secure/confidential assets to only authorized personnel. The systems provide auditing by logging dates and times that specific individuals gain authorized access to the assets.

However, once an individual obtains authorized access to a designated asset, very few security systems continue to monitor actions taken by the individual with respect to the designated asset or with respect to other assets that are accessible to the individual with that individual's authorized access to the designated asset. That is, other secure assets may be compromised or stolen by the individual when the individual was only permitted to access one of the assets during an authenticated access.

Not only is the above-noted situation problematic to existing security, but discovering how an asset that was compromised or stolen is also problematic for existing auditing systems. This is because the audit trail for an authenticated access to a designated asset is typically focused only on actions taken by the individual with respect to the designated asset. As a result, all individuals that authenticated for access to any of the assets have to be investigated to discover where culpability should be assigned.

Additionally, existing security systems are not generally focused on real-time detection of a potential security breach during an authorized access. That is, most security systems assume that if one has authenticated access, then there is no security breach and no need to continue to monitor the authorized individual during the authenticated access.

Yet, most theft of assets or information occur from employees known the security procedures and security systems well, such that it becomes easier for these nefarious employees to circumvent both the existing security and the existing auditing used to discover how the theft occurred.

SUMMARY

In various embodiments, methods and a system for secure zone monitoring are presented.

According to an embodiment, a method for secure zone monitoring is presented. A session is initiated for an individual upon detected of the individual being present within a zone. A session is created for an individual detected within a zone. Behaviors of the individual within the zone are tracked from images captured within the zone. A particular behavior of the individual is detected with respect to an asset within the zone, and an audit of the session is initiated based on the particular behavior.

DETAILED DESCRIPTION

Figure 1:
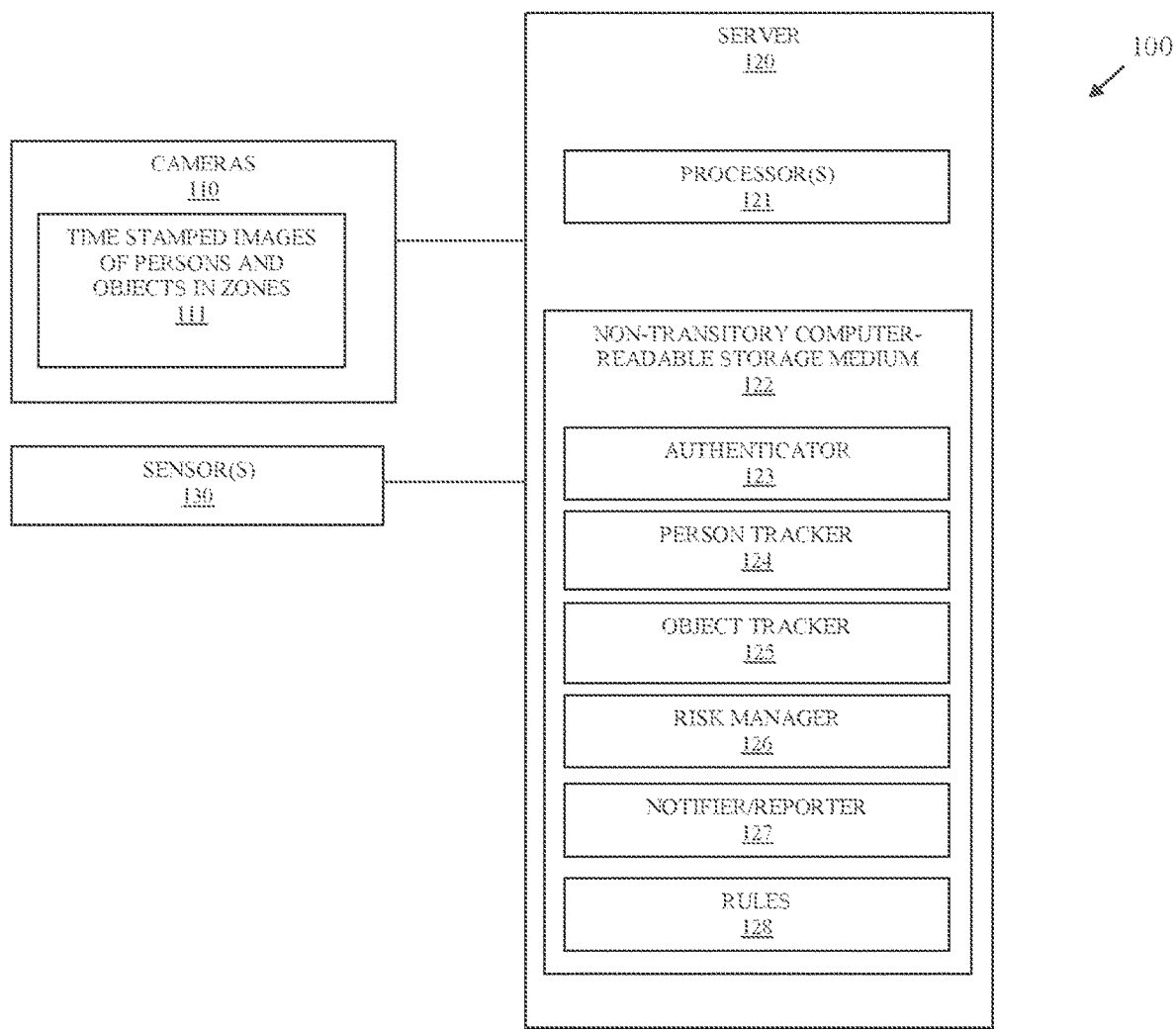
FIG. 1 is a diagram of a system for secure zone monitoring, according to an example embodiment.

FIG. 1 is a diagram of a system 100 for secure zone monitoring, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only it is to be noted that other arrangements with more or less components are possible without departing from the teachings of secure zone monitor, presented herein and below.

As used herein and below, the terms "user," "personal," "operator," "person," "individual," and "requestor," may be used interchangeably and synonymously. The terms refer to an individual attempting to gain access to a secure zone or secure access.

The term "zone" refers to a predefined area or an enterprise that is being monitored within images captured by cameras/video cameras. The entire area may be monitored through the images or just pre-designated objects within portions of the area. The zone may require authentication to access or the zone may not require authentication to access but includes assets that being monitored for auditing or theft-avoidance.

An "object" refers to a secure asset that is being monitored within the images. An object may be a device represented in the images a log book, a drawer, a desk, a safe, a Point-Of-Sale (POS) terminal, a Self-Service Terminal (SST), an Automated Teller Machine (ATM), a computer monitor, a piece of jewelry, anything of value or having confidential information, etc.

System 100 includes a plurality of cameras 110 that capture time-stamped images of persons and objects in zones (herein after just "images 111"). System 100 also includes server 120, and a plurality of sensor(s) 130. Server 120 includes executable instructions that execute on one or more hardware processors of server 10 from a non-transitory computer-readable storage medium 122 as: authenticator 123, person tracker 124, object tracker 125, risk manager 126, notifier/reporter 127. Non-transitory computer-readable-storage medium 122 also includes rules 128.

It is to be noted that there may be multiple servers 120, such that the different elements 123-127 may execute on a same server 120 or multiple different servers 120 networked together.

Cameras 110 are preconfigured to capture images 111 of the defined areas (zones) based on the field-of-view of the lenses of cameras 110. Some of cameras 110 may capture images 111 representing portions of a different area that a different one of the cameras 110 captures images 111 for. That is, each image 111 can include pixel values that overlap multiple ones of the defined areas (zones).

Initially, cameras 110 are situated in locations throughout an enterprise (such as a bank but can be other enterprises or even a consumer's home). Each camera lens configured to cover one or more predefined areas (zones) of the physical space of the enterprise.

Furthermore, metadata is assigned to each camera 110 to include a unique camera identifier, a location identifier (representing the physical location that camera 110 is situated within the enterprise), and one or more area identifiers (representing the predefined areas (zones) that the lens of camera 110 captures in the images 111).

Each camera 110 provides time stamp and image-frame stamped images to server 120. These images can be streamed over a wired or wireless connection between cameras 110 and server 120 to a commonly accessible storage area on server 120 that is accessible to notifier/reporter 127. In an embodiment, some of the images when streamed from cameras 110 can be buffered or cached in memory of cache and made accessible from the memory or cache to 123-127.

Each accessible image 111 includes its metadata (minimally including what was discussed above) with its image 111 on the server 120.

Rules 128 are statements that are interpreted by 123-127 to cause customized processing for purposes of monitoring, reporting, and auditing specified zones and objects (secure assets) within the zones. The statements are data structures that 123-127 are preconfigured to process and include conditional logic and predefined action identifiers/labels, which map to actions that 123-127 are to perform. Each statement from rules 128 mapped to a zone identifier for a zone, mapped to an object identifier for an object (asset), and may include its own unique rule identifier/rule label, which corresponds to an event being tracked in system 100.

For example, consider the following rule 128:

Rule Person-Access, Zone ID=Safe-Area; -If Person present, record until not present go to rule monitor-interaction-assets.

When an event is raised that corresponds to "Person-Access" tracker 124. Authenticator 123 raises the event when authenticated access is obtained through authentication procedures by a specific individual/person. Raising of the event causes person tracker 124 and object tracker 125 to inspect rules 128 for a rule identified with the raised event (Person-Access). Person tracker obtains image frames that correspond to a camera 110 having a defined area that matches zone identifier/label of Safe-Area, person tracker 124 and object tracker 125 are provided the frames and look for rules 128 that match the zone identifier. This retrieves the sample rule listed above. The rule is then evaluated and if person tracker 124 detects a person in the frames, person tracker 124 records all such frames with time and date stamps in an audit data store until the person is no longer present in any of the image frames passed by cameras 110. Additionally, person tracker 124 and object tracker 125 are instructed in the rule 128 to retrieve a rule associated with monitoring interaction with assets (monitor-interaction-assets). That rule 128 may include statements (sub rules) that instruct person tracker 124 and object tracker 125 to focus on any touching of, moving of, and/or leaving with a secure asset that is being monitored for the person being tracked and perform additional actions based on such a detection.

The authenticator 123 may also track persons within a zone that is available to the public or a zone with limited or restricted access. In this case, there is no authentication of the person to an identity; rather, a generic but unique person identifier is assigned to the person during the session. A session is initiated by the authenticator 123 when a person is detected by the person tracker 123 as being within an area (zone) that is being monitored. Therefore, it is to be understood that the person can be known (authenticated to an identity) or unknown (not authenticated to an identity) and in both situations the person is tracked through either an assigned identity or an assigned unique person identifier (for an unknown but tracked person).

It is to be noted that the above example was presented for purposes of illustration and comprehension as rules 128 can be more complex and can identify processing actions for risk manager 126 and/or notifier/reporter 127. Furthermore, a rule 128 can include multiple statements or sub-rules as nested rules 128. Rules 128 drive the processing flow and processing actions taken by 123-127. Each enterprise can custom develop rules 128 in accordance with their business requirements for the secure zones and secure assets being monitored.

In an embodiment, system 100 includes a user-facing interface that permits rules 128 to be created, modified, and/or deleted. So, an enterprise does not need to deploy software changes to utilize system 100; rather, an enterprise manages rules 128, which configures and causes 123-127 to perform customized monitoring, authentication, and auditing in accordance with rules 128. This means system 100 is flexible and extensible without software modifications being needed to 123-127.

Some rules 128 can define behaviors or actions taken by a person or asset (object) being tracked, such as holding a key (one object), putting an object in a pocket or bag, leaving with an object, grasping a door handle (another object), sitting in front of a secure monitor, stationary within a zone for a minimum period of elapsed time, holding something of value, multiple persons in a given zone, looking in a direction of a specific camera 110, placing a hand on a specific access device/sensor 130, putting an object over or covering a camera; etc.

Person tracker 122 and object tracker 125 perform image processing on images 110 to identify and track behaviors of persons and objects (secure assets) detected in the images 110. This is done through analysis of pixels included in the images 110 and can be achieved in a variety of manners. For example because the field-of-view is known for a given camera 110, secure assets represented as objects can be defined as residing in given pixel locations of images 110 taken by camera 110. When pixels for the object become occluded in some manner or represent something other than the object, object tracker 125 knows that an event is occurring that needs to be tracked. A bounding box can be drawn around the pixels that represent the object from training images, these pixels can be sampled to produce values. If the object is non-stationary, the bounding box can be identified in subsequent images 110 for the values to track movements of the object from image frame to image frame. Person tracker 122 can similarly use a bounding box approach with preconfigured attributes for a person and with specific attributes for a known person (employee of the enterprise). Such attributes can include; height, gender, clothing color and type, facial features, skin tone, extremities, shoe color and type, etc. This allows person tracker 124 to create a bounding box around an unknown or known person and track the bounding box from image frame to image frame.

In addition to the above or as a substitute to what was discussed above, person tracker 124 and object tracker 125 may utilize a trained machine-learning or deep learning algorithm that is pre-trained on images of persons and objects to identify and track the persons and objects from image frame to image frame.

Both person tracker 124 and object tracker 125 may also be trained to identify the pre-defined behaviors within the image frames as a person and object are being tracked from frame to frame. The behaviors can include identifiers, which may also corresponding to specific rules 128 to identify processing actions.

Rules 128 may also indicate that person tracker 124 and/or object tracker 125 are to raise events (which corresponds to specific entries (statements) in rules 128) upon detection of a predefined behavior of the person with respect to the zone of a given object. Risk manager 126 receives the raised events for the behaviors noted and obtains specific rules 128 that corresponding to the events (behaviors), the rules drive processing actions of risk manager 126. Each raised event is logged in an audit data store for the authenticated access that was granted to the person by the authenticator 123. Notifier/reporter 127 performs the logging and depending and/or alerts) that notifier/reporter 127 is assigned to process.

Risk manager 126 includes an Application Programming Interface (API) for interacting with authenticator 123. Authenticator 123 maintains a session for an authenticated person or non-authenticated but tracked person present within a given zone being monitored. During this session, risk manager 128 makes decisions about how the session is progressing with the session based on events (behaviors) being raised by person tracker 124 and object tracker 124. The decisions taken and the instructions provided back to authenticator 123 are defined in rules 128. For example, risk manager 126 may use the API to instruct authenticator 123 to immediately terminate any authenticated access session of an authorized person. The authenticator 123 can access rules 128 to define what actions need to be processed when terminating an in-progress authenticated session, such as cause an automated voice to play over a speaker voice instructions that the session has terminated and the authorized person is to immediately leave the zone as the door will shut and be locked within a designated amount of time. Other actions can be taken as well when terminating the session, such as sending a text message to a registered mobile device of the person indicating that the session terminated and the person is to immediately leave the secure zone. It is noted that because actions of 123-127 are driven by customized rules 128 any desired automated action can be processed upon termination of an authenticated session.

As can be seen, system 100 permits real-time monitoring of behaviors of authorized persons and unauthorized persons that have access to zones being monitored, such that real-time decisions can be made by risk manager 126 to terminate a given session through interaction with authenticator 123, to initiate an audit, or to process any user-defined action. Concurrently, notifier/reporter 127 can perform its own customized actions based on behaviors detected as raised events and/or based on whether a session is being abnormally terminated or not. That is, even if a session is not terminated in the authenticated person situation, certain detected events (behaviors) can cause specialized reporting or notification to be processed by notifier/reporter 127.

In addition to the above stated processing, a variety of sensors 130 may be configured to raise events during a session. Again, the events map to rules 128, such that some behaviors of the person can be confirmed or independently determined based on the events being raised by sensors 130. Risk manager 126 receives these raised events from the sensors and can use them independently of person tracker 124 and object tracker 125 to make decisions regarding what is transpiring during a session in the zone. Similarly, notifier/reporter 127 can uses events raised by sensors 130 independent of person tracker 124 and object tracker 125 to make decision regarding what notifications or reports are needed for a session. It is noted that both risk manager 126 and notifier/reporter 127 may also use events raised by sensors 130 to augment, adjust and/or compliment events raised by person tracker 124 and object tracker 125.

A more detailed discussion of the processing associated with authenticator 123, risk manager 126, and notifier/reporter in connection with the raised events provided by sensors 130, person tracker 124, and object tracker 125 is provided below with FIG. 2.

Figure 2:
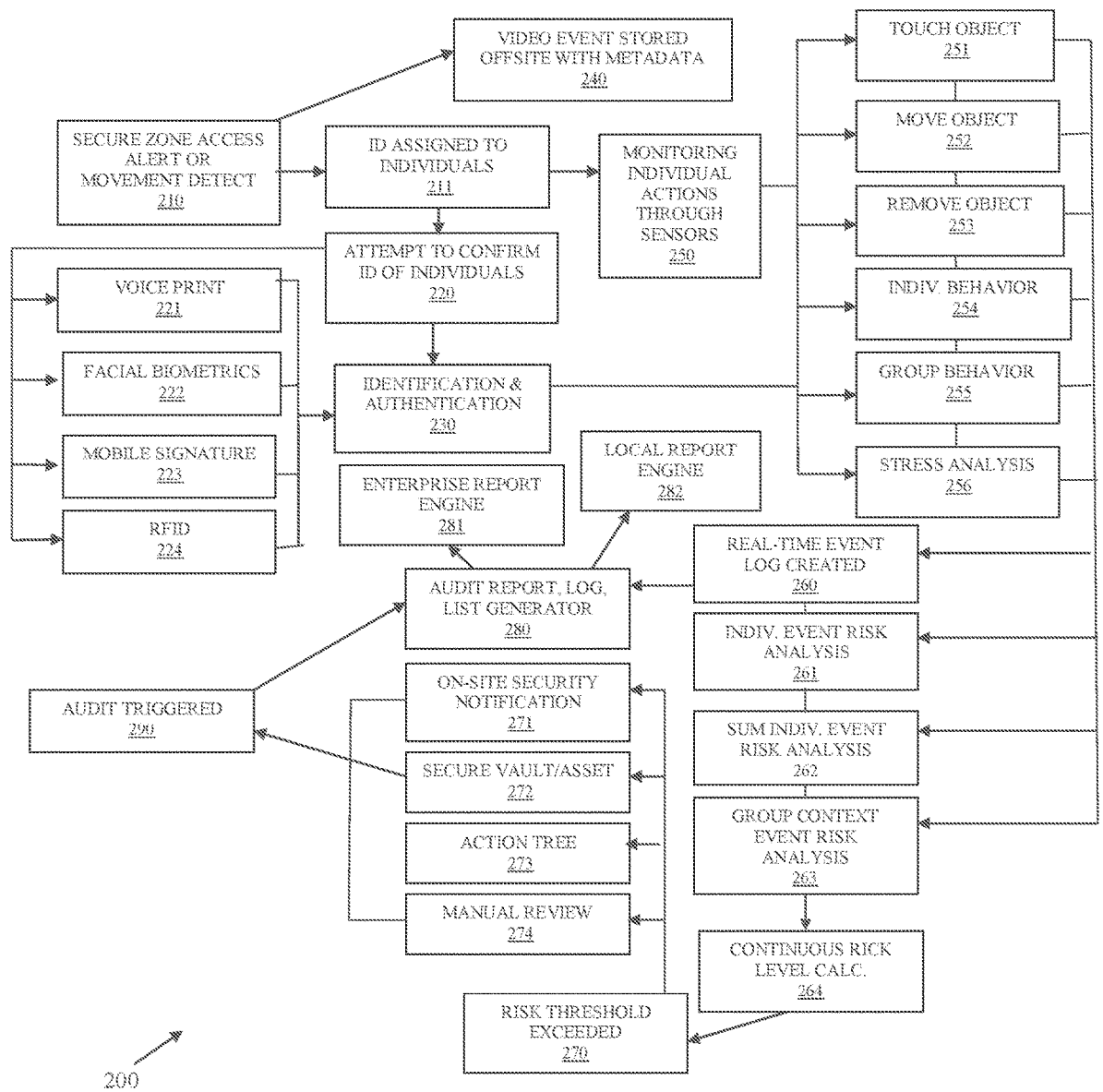
FIG. 2 is a diagram of processing associated with secure zone monitoring, according to an example embodiment.

FIG. 2 is a diagram of processing associated with secure zone monitoring, according to an example embodiment.

The processing depicted in FIG. 2, represents authenticated session, auditing, reporting, and alerting actions taken primarily by authenticator 123, risk manager 126, and notifier/reporter 127. Some actions in FIG. 2 represent processing associated with person tracker 124 and object tracker 125 that interact with and initiate more detailed processing of authenticator 123, risk manager 126, and notifier/reporter 127.

Initially, at 210, authenticator 123 is activated based on detection of an authorized person making an attempt to access a secure zone within an enterprise. This can be detected in a variety of manners. Some are affirmatively made by the person, such as accessing an access device to obtain entry, standing in front of a monitored door or area for a preconfigured amount of time, making a gesture that is detected in images 110, accessing a mobile application that connects to authenticator 123, and other manners. The request or detected access attempt is then flagged with an identifier and stored, at 240, with the metadata of images 110 in an offsite storage location (note this can be onsite as well).

At 211, authenticator 123 assigns a generic identifier to the individual requesting access upon detection of the request for access by the individual. This allows tracking of that individual even if such individual does not successfully authenticate for access to the zone through authenticator 123.

At 220, authenticator 123 attempts to confirm the identity of the individual through a variety mechanisms. The mechanisms may be custom-defined within rules 128.

For example, at 221 a voice print of the individual is obtained through a microphone sensor 130 (can also be a microphone on a user-operated device. In another case, images 110 are processed for facial recognition of the individual. At 223, a mobile signature sent from a mobile device and mobile application that executes on the mobile device is verified (this is a cryptographic digital signature that registered with the mobile device/mobile application (app). At 224, the individual may possess a (RF) scanner, such that the individual does not have to perform any affirmative action as long as the individual has the badge or card on the individual's person somewhere.

At 230, authenticator 123 performs authentication on the individual using information gathered for the individual at 221-224.

When the identity of the individual is successfully authenticated and access to the secure zone is provided by the authenticator 123, at 250, an event is raised that instructs sensors 130, person tracker 124, and object tracker 125 to begin reporting events (behaviors) for the known and authenticated individual while that individual is permitted access into the secure zone. The raised event of successful access for an authenticated session within the secure zone is also received by risk manager 126 and notifier/reporter 127.

A variety of behaviors/actions can be monitored by the person tracker 123, object tracker 124, and sensors 123. For example, when a secure asset (object) is touched at 251, when a secure asset (object) is moved within the secure zone at 252, when a secure asset (object) is removed at 253, when behavior of the individual appears suspicious based on predefined suspicious behaviors at 254, when behaviors of others in a group of individuals appears suspicious based on predefined group suspicious behaviors at 255, and a stress/emotion/sentiment analysis of the individual at 256.

Each detected behavior/action is raised as an event for the authenticated session within the secure zone and obtained logged in real time at 260 by the notifier/reporter 127. The risk manager 123, at 261, performs an event risk analysis for the event raised. At 262, the risk manager 126 assigns values to each detected event and sums or performs a weighted calculated sum on all events detected for the authentication session. When more than one individual is present in the secure zone, at 263, the risk manager 126, assigns values and sums or performs a weighted calculated sum on all events detected for each individual as a group context risk assessment/analysis. At 264, with each new detected event, updates and calculates a current risk score for the authenticated session. When, at 270, the current risk score exceeds a predefined threshold, risk manager 126 may notify authenticator 123 for automated actions to be taken or may notifier the notifier/reporter 127 for automated actions to be taken.

Some automated actions when the current risk score exceeds a threshold score include: sending notification to an on-site security device/system at 271, sending a notification that instructs a vault or an asset to be locked or locked down at 272, performing automated and business specific actions defined in an action tree at 273, and/or sending a notification to a designated person to perform a manual review of the current authenticated session activity/behaviors at 274. When the vault is secured or locked down based on the current risk score, notifier/reporter 127 sends s notification to an audit system to trigger an audit of the authenticated session at 290.

Concurrent with the actions of risk manager 126, notifier/reporter 127 performs its own automated actions. For example, at 280, notifier/reporter 127 logs all relevant information for the authenticated session including images 110, risk scores, actions/behaviors, etc. Notifier/reporter 127 may also generate an audit report, generated a log specific to the authenticated session, and/or generate a list of action items that need to be performed by staff based on the authenticated session activity/behaviors. This may trigger, at 281 an enterprise-wide report be produced by the enterprise-report engine; and/or may trigger a local/store-specific report be generated by a local report engine, at 282.

System 100 provides a real-time event based secure zone monitoring technique that utilizes sensors 130 and computer vision to identify actions/behaviors taken by an individual or multiple individual that have been given authenticated access to the secure zone. The authenticated session is monitored in real-time and decisions are made whether to terminate the session, alert systems, initiate an audit, and produce reports based on a dynamically calculated risk score that is continuously changing during the authenticated session.

System 100 is customizable because processing actions for any given action/behavior and risk assessment (based on current risk score compared against a threshold) are defined by an enterprise within rules 128. Thus, different actions, reporting, and notifications are completely user-controlled depending upon the business needs of any given enterprise.

In an embodiment, the sensors 130 can include: RFID sensors, weight sensors, light-based sensors, motion sensors, temperature sensors, humidity sensors, audio sensors that activate on sound, WiFi or wireless signal detection sensors, and others. The sensors 130 can be located throughout the secure zone and/or located on or in specific secure assets.

In an embodiment, the enterprise deploying system 100 is a bank.

In an embodiment, the enterprise deploying system 100 is any enterprise that has a secure zone within which secure assets are being monitored for access. This can include areas comprising items of value or items that represent confidential information.

It is to be noted that although the illustrations are discussed above within the context of a bank, the system 100 and techniques presented herein and below can be deployed to secure monitor, report and audit access to any area (zone) having secure assets. The system 100 and techniques also provided irrefutable audit trails to each asset of a secure area (zone).

The above-noted embodiments and other embodiments are now discussed with reference to FIGS. 3-5.

Figure 3:
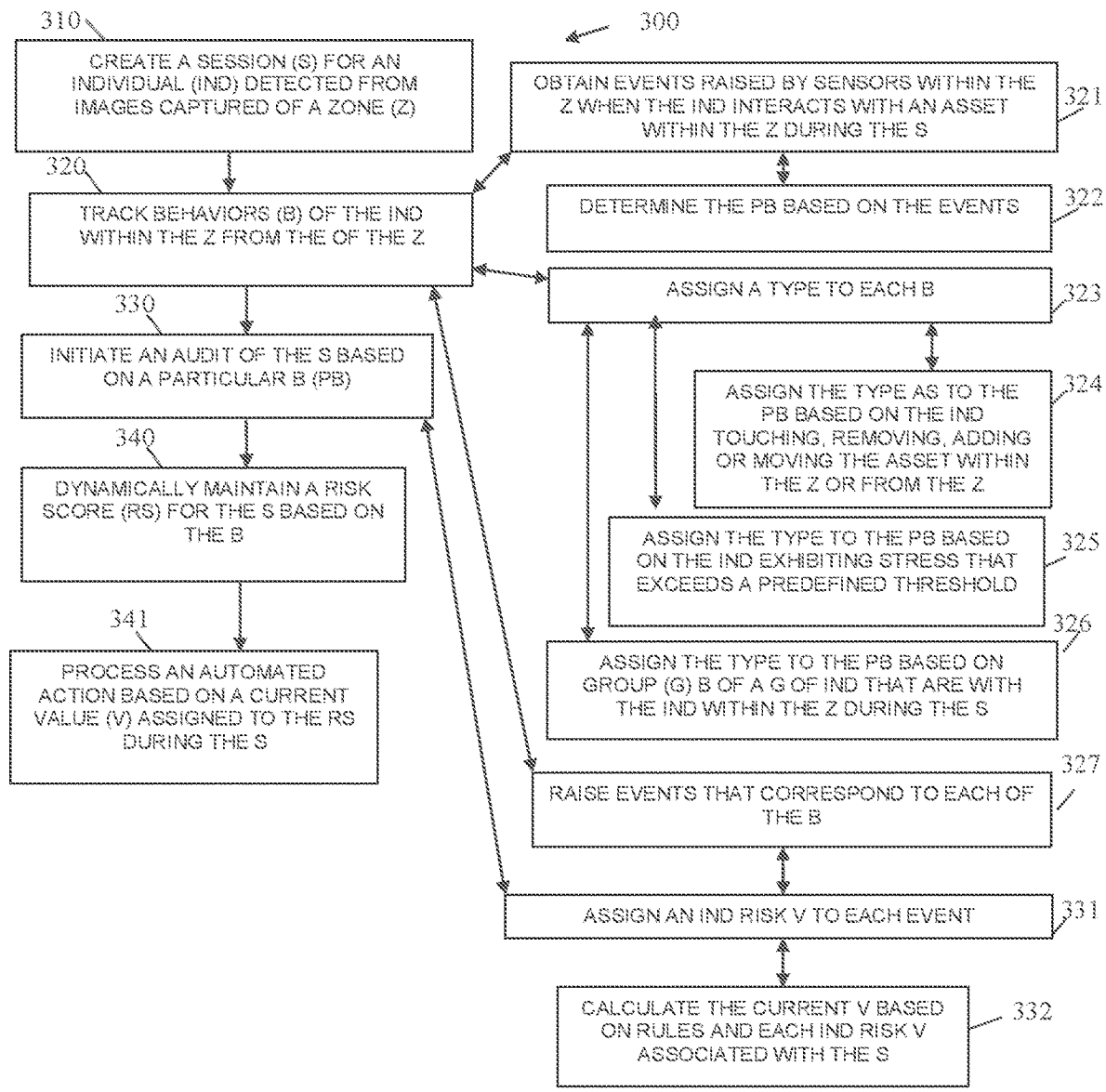
FIG. 3 is a diagram of a method for secure zone monitoring, according to an example embodiment.

FIG. 3 is a diagram of a method 300 for secure zone monitoring, according to an example embodiment. The software module(s) that implements the method 300 is referred to as a "zone monitor." The zone monitor is implemented as executable instructions programmed and residing within memory and/or non-transitory computer-readable (processor-readable) storage medium and executed by one or more processors of a device. The processor(s) of the device that executes the zone monitor are specifically configured and programmed to process the zone monitor. The zone monitor may have access to one or more network connections during its processing. The network connections can be wired, wireless, or a combination of wired and wireless.

In an embodiment, the device that executes the zone monitor is server 120. In an embodiment, server 120 is a cloud-based server, a local-area network (LAN)-based server, or a wide-area network (WAN) server.

In an embodiment, the zone monitor is all or some combination of: the authenticator 123, person tracker 124, object tracker 125, risk manager 126, and/or notifier/reporter 127.

At 310, the zone monitor creates a session for an individual detected from images that are captured of a zone (predefined area having secure or assets that are audited).

In an embodiment, the zone is inside a locked and secure area where the individual has authenticated to an authentication service that controls access to the zone and has started an approved and authenticated access session for accessing the zone and secure assets maintained within the zone.

In an embodiment, the zone is an area accessible to employees of an enterprise or customers of the enterprise and the identity of the individual is unknown during the session.

At 320, the zone monitor tracks behaviors of the individual within the zone from the images captures of the zone. This can be achieved utilizing the person tracker 123 and the object tracker 124 along with rules 128 as was discussed above with FIGS. 1-2.

In an embodiment, at 321, the zone monitor obtains events raised by sensors within the zone when the individual interacts with an asset within the zone during the session. The sensors can be any the above-mentioned sensors discussed with FIGS. 1-2.

In an embodiment of 321 and at 322, the zone monitor determines a particular behavior based on the events.

In an embodiment, at 323, the zone monitor assigns a type to each behavior. This type can be defined in rules 128.

In an embodiment of 323 and at 324, the zone monitor assigns the type to a particular behavior based on the individual has touching, removing, adding, or moving an asset within the zone or from the zone. The individual can add an asset to the zone. For example, the asset may be an executed loan document (legal instrument), or car keys (rental car return), where the individual is detected as bringing the asset into the zone and leaving the asset within the zone.

In an embodiment of 323 and at 326, the zone monitor assigns the type to a particular behavior indicating based on the individual exhibiting stress/emotion/sentiment that exceeds a predefined threshold. The predefined threshold defines characteristics of an individual that is exhibiting stress/emotion/sentiment. The characteristics can include excessive movement of fidgetiness, facial features, an excessive heart rate, voice with excessive volume or pitch, etc.

In an embodiment of 323 and at 326, the zone monitor assigns the type to a particular behavior based on a group behavior for a group of individuals that are with the individual within the zone during the session. That is, interactions of multiple individuals are monitored and assigned a type of group behavior. Again, this can be defined in the rules 128.

In an embodiment, at 327, the zone monitor raises events that correspond to each of the behaviors.

In an embodiment, the zone monitor assigns the type to the particular behavior based on detecting that the individual stops looking at another individual within the zone during the session. Here a security protocol may require that two individuals in the zone maintain a posture or position that faces one another while in the zone. This is detected and raised as a particular type of event. In an embodiment of the embodiment, the zone monitor may send or cause to display an alert or notification on a user-operated device or monitor (can be a wearable device) so as to alert the appropriate personnel of the violation of protocol. This may also be when the individual turns his/her back on a secure asset while security protocol requires that the individual maintain a posture of facing the asset at all times.

In an embodiment, the zone monitor assigns the type to the particular behavior based on detecting that a distance between the individual and a secure asset exceeds a threshold distance. That is, the individual may be required to stay within a short distance of a secure asset at all times within the zone. Should the individual exceed that threshold distance, the appropriate security message may be sent to the appropriate security personnel-operated devices.

At 330, the zone monitor initiates a real-time audit of the session based on a particular behavior or a particular set of behaviors detected at 320.

In an embodiment of 327 and 330, at 331, the zone monitor assigns an individual risk value to each event.

In an embodiment of 331 and at 332, the zone monitor calculate the current value of the risk score based on rules and each individual risk value associated with the session.

In an embodiment, at 340, the zone monitor dynamically maintains a risk score for the session based on the behaviors detected at 320.

In an embodiment of 340 and at 341, the zone monitor processes an automated action based on a current value assigned to the risk score during the session.

In an embodiment of 341, the zone monitor compares the current value for the risk score against a threshold value and determines that a potential fraudulent situation is occurring during the session.

In an embodiment of 341, the zone monitor obtains an identifier for the action from an action tree data structure based on the potential fraudulent situation. In an embodiment, the action tree data structure includes a plurality of sub-actions that are custom defined for a given enterprise associated with the zone.

Figure 4:
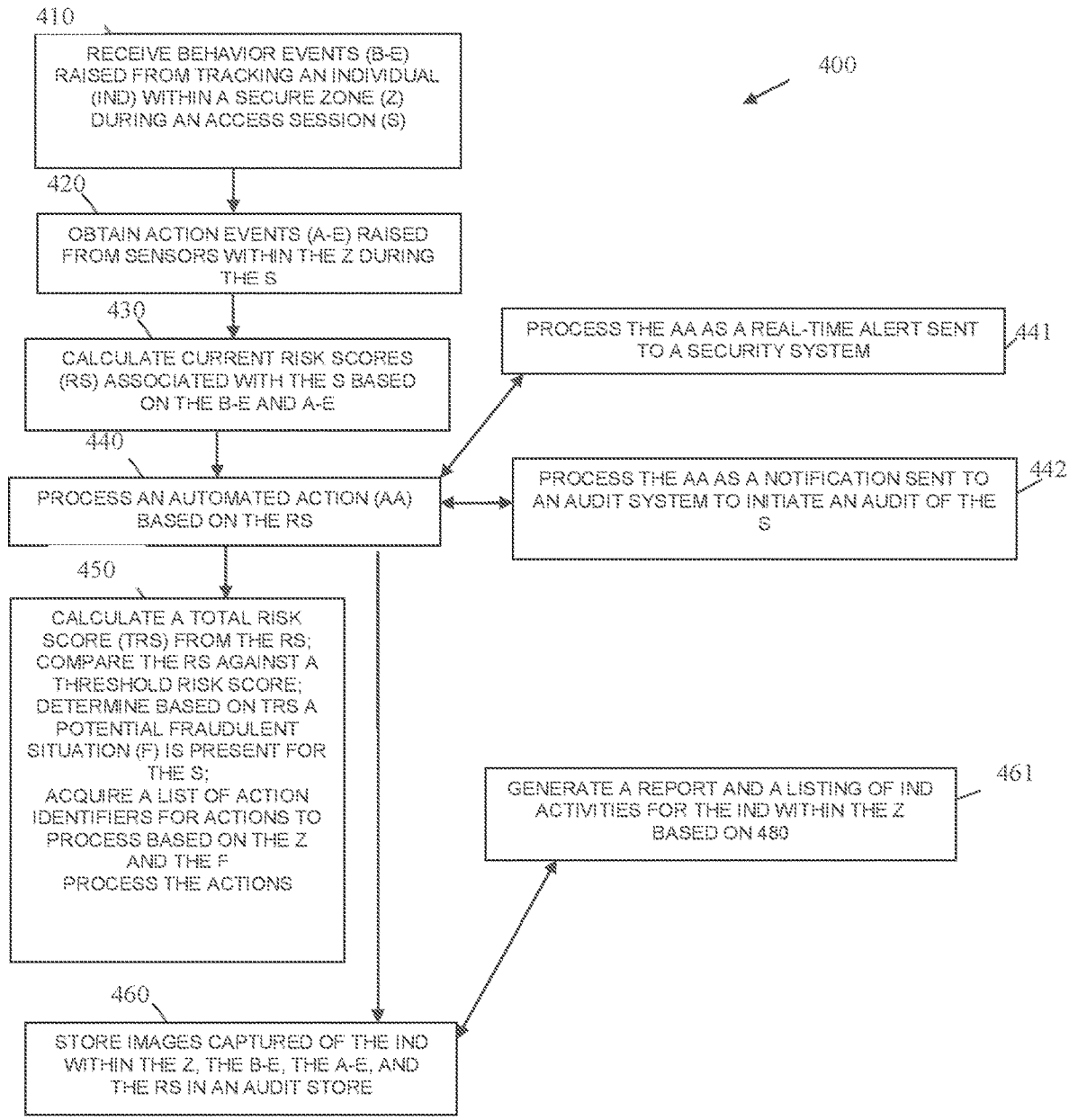
FIG. 4 is a diagram of another method for secure zone monitoring, according to an example embodiment.

FIG. 4 is a diagram of another method 400 for secure zone monitoring, according to an example embodiment. The software module(s) that implements the method 400 is referred to as an "access monitor." The access monitor is implemented as executable instructions programmed and residing within memory and/or a non-transitory computer-readable (processor-readable) storage medium and executed by one or more processors of a device. The processors that execute the access monitor are specifically configured and programmed to process the access monitor. The access monitor may have access to one or more network connections during its processing. The network connections can be wired, wireless, or a combination of wired and wireless.

In an embodiment, the device that executes the access monitor is the server 120. In an embodiment, the server 120 is a cloud processing environment, a LAN server, or a WAN server.

In an embodiment, the access monitor is all of or some combination of: authenticator 123, person tracker 124, object tracker 125, risk manager 126, notifier/reporter 127, and/or the method 300.

The access monitor presents another and in some ways enhanced processing perspective of the method 300 discussed above.

At 410, the access monitor receives behavior events raised from tracking an individual within a zone (predefined area) during an access session.

In an embodiment, the zone is a secured area that the individual was authenticated to access and for which an identity was assigned to the individual after authentication.

In an embodiment, the zone is a non-secure area or limited-access area for which no authentication is required to access and the identity of the individual is unknown. In an embodiment, the identity of the individual is unknown when the session is started but is discovered and assigned to the individual during the session through automated facial recognition of the individual obtained from the images.

At 420, the access monitor obtains action events raised from sensors within the zone during the session. The action events indicating that the individual has taken some action with respect to a particular secure asset located within the secure zone (such as touched, moved, removed from the secure zone, etc.). The asset can be any object that is subject to auditing by the enterprise.

At 430, the access monitor calculates current risk scores associated with the access session based on the behavior events and action events.

At 440, the access monitor processes at least one automated action based on the risk scores. These automated actions can be user-defined through the user of rules 128.

In an embodiment, at 441, the access monitor processes at least one action as real-time alert sent to a secure system. The security system configured to process a variety of other automated security actions based on receipt of the alert.

In an embodiment, at 442, the access monitor processes at least one action as a notification sent to an audit system to automatically initiate an audit of the authenticated access session.

In an embodiment of 440, the access monitor processes at least one action as an instruction sent to automatically lock down a secure asset associated with the secure zone. This may be an instruction to lock a door or a latch.

In an embodiment, at 450, the access monitor calculates a total risk score from the risk scores, compares the total risk score against a threshold risk score, determines based on the total risk score a potential fraudulent situation for the access session based on the zone and the potential fraudulent situation, and processes security or audit based actions defined in rules.

In an embodiment of 450, the access monitor acquires a list of action identifiers for actions to process based on the secure zone and the potential fraudulent equation.

In an embodiment of 450, the access monitor processes the actions using the action identifiers. This is done in real-time and while the authenticated access session is ongoing and the user is within the secure zone.

In an embodiment of 450 the access monitor processes at least one action as an instruction sent to automatically lock down a secure asset associated with the secure zone. This may be an instruction to lock a door or a latch.

In an embodiment, at 460, the access monitor stores images capture of the individual within the zone, the behavior events, the action events, and the risk scores in an audit store.

In an embodiment of 460, at 461, the access monitor generates a report and a listing of individual activities for the individual within the zone based on 460.

Figure 5:
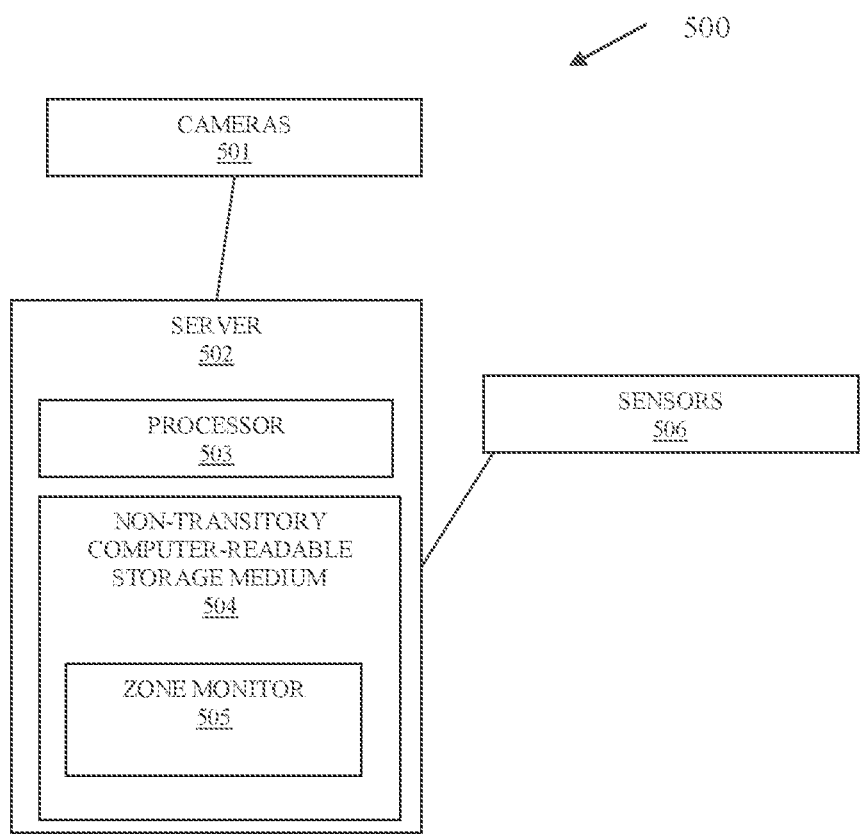
FIG. 5 is a diagram of another system for secure zone monitoring, according to an example embodiment.

FIG. 5 is a diagram of a system 500 for secure zone monitoring, according to an example embodiment. The system 500 includes a variety of hardware components and software components. The software components of the system 500 are programmed and reside within memory and/or a non-transitory computer-readable medium and execute on one or more processors of the system 500. The system 500 communicates over one or more networks, which can be wired, wireless, or a combination of wired and wireless.

In an embodiment, the system 500 implements, inter alia, the processing described above with the FIGS. 1-4.

In an embodiment, system 500 is the camera 110 and the server 120.

The system 500 includes a plurality of cameras 501, a server 502, and sensors 506. The server 502 includes at least one hardware processor 503, a non-transitory computer-readable storage medium 504 having executable instructions representing a zone monitor 505.

The zone monitor 505 when executed from the non-transitory computer-readable storage medium 504 on the processor 503 is configured to cause the processor 503 to: 1) identify behaviors of an individual from the images captured by the cameras 501 within a predefined area during a session that is generated upon detection of the individual within the predefined area; 2) obtain events generated by the sensors for actions taken by the individual with respect to assets located within the predefined area; and 3) and process an automated action based on the behaviors and the events.

In an embodiment, the zone monitor 505 is all or some combination of: authenticator 123, person tracker 124, object tracker 125, risk manager 126, notifier/reporter 127, method 300, and/or method 400.

In an embodiment, the sensors 506 include one or more of: RFID sensors, weight sensors, light-based sensors, motion sensors, temperature sensors, humidity sensors, audio sensors that activate on sound, and/or WiFi or wireless signal detection sensors.

In an embodiment, the zone monitor 505 is further configured when executed by processor 503 from non-transitory computer-readable storage medium 504 to cause processor 503 to: 4) calculate a current risk score during the access session based on the behaviors and the events; and 5) determine whether to send a security alert to a security system and whether to send a notification to an auditing system based on the current risk score.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments various features are grouped together in a single embodiment for the purpose of streamlining the disclosure. This method of disclosure is not to be interpreted as reflecting that the claimed embodiments have more features than are expressly recited in each claim. Rather, as the following claims reflect inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
creating a session for an individual detected within images that are captured of a zone;
tracking behaviors of the individual within the zone from the images, wherein tracking further includes assigning a type to each behavior, wherein assigning further includes assigning the type to a particular behavior based on detecting that a distance between the individual and an asset exceeds a threshold distance;
detecting the particular behavior of the individual with respect to the asset within the zone; and
initiating an audit of the session based on the particular behavior.

2. The method of claim 1 further comprising, dynamically maintaining a risk score for the session based on the behaviors.

3. The method of claim 2 further comprising, processing an automated action based on a current value assigned to the risk score during the session.

4. The method of claim 1, wherein tracking further includes obtaining events raised by sensors within the zone when the individual interacts with the asset within the zone during the session.

5. The method of claim 1, wherein tracking further includes determining the particular behavior based on the events.

6. The method of claim 1, wherein assigning further includes assigning a second type to a second particular behavior based on the individual touching, removing, adding, or moving the asset within the zone or from the zone.

7. The method of claim 1, wherein assigning further includes assigning a second type to a second particular behavior based on the individual exhibiting stress that exceeds a predefined threshold.

8. The method of claim 1, wherein assigning further includes assigning a second type to a second particular behavior based on group behaviors of a group of individuals that are with the individual within the zone during the session.

9. The method of claim 1, wherein assigning further includes assigning a second type to a second particular behavior based on detecting that the individual stops looking at another individual within the zone during the session.

10. The method of claim 9, wherein assigning further includes displaying an alert on a user-operated device based on detecting that the individual stops looking or making eye contact with the other individual.

11. A method, comprising:
    creating an access session upon automated detection of an individual within a zone from images captured by cameras situated within the zone;
    obtaining behavior events that are detected from behaviors of an individual within the images during the access session;
    obtaining action events generated by sensors within the zone during the access session;
    calculating risk scores associated with the access session based on the behavior events and the action events;
    processing at least one automated action based on the current risk scores;
    calculating a total current risk score from the risk scores;
    comparing the total current risk score against a threshold risk score;
    determining based on the comparing a potential fraudulent situation is present for the access session;
    acquiring a list of action identifiers for other actions to process based on the zone and the potential fraudulent situation; and
    processing the other actions.

12. The method of claim 11, further comprising, storing images captured of the individual within the zone, the behavior events, the action events, and the current risk score in an audit store.

13. The method of claim 12, wherein storing further includes generating a report and a listing of individual activities for the individual within the zone based on the storing.

14. The method of claim 11, wherein processing further includes processing the at least one automated action as an alert sent to a security system.

15. The method of claim 11, wherein processing further includes processing the at least one automated action as a notification sent to an audit system to initiate an audit of the access session.

* * * * *